United States Patent [19]

Moriya et al.

[11] 4,032,482
[45] June 28, 1977

[54] PROCESS FOR PRODUCING CHELATING RESIN AND PRODUCT PRODUCED THEREBY

[75] Inventors: Masafumi Moriya, Tokyo; Kazuo Hosoda, Hoya; Makoto Takai, Chiba; Shiro Mano, Iruma, all of Japan

[73] Assignee: Miyoshi Yushi Kabushiki Kaisha, Tokyo, Japan

[22] Filed: Mar. 20, 1975

[21] Appl. No.: 560,174

[30] Foreign Application Priority Data

Mar. 25, 1974  Japan .............................. 49-32485
Feb. 12, 1975  Japan .............................. 50-16903

[52] U.S. Cl. .............................. 260/2.2 R; 210/24; 260/2 N; 260/2.1 R; 260/29.2 EP; 260/47 EN; 260/830 P; 260/DIG. 6; 423/24; 423/89; 423/100

[51] Int. Cl.² .............................. C08G 30/14
[58] Field of Search ......... 260/2.2 R, 2.1 R, 47 EP, 260/29.2 EP, 2 EN, 2 N, 830; 210/54, 24

[56] References Cited
UNITED STATES PATENTS 3,414,550  12/1968  D'Alelio .......................... 260/2.2 R
3,635,842  1/1972  Longoria .................... 260/29.2 EP

FOREIGN PATENTS OR APPLICATIONS 761,443  11/1956  United Kingdom
990,030  4/1965  United Kingdom Primary Examiner—Theodore E. Pertilla
Attorney, Agent, or Firm—Cushman, Darby & Cushman

[57] ABSTRACT

A process for producing a spherical chelating resin is disclosed. In the production, a prepolymer is prepared in the absence or presence of a solvent by subjecting a poly-N-substituted polyamine having at least two residual active hydrogen atoms bonded to nitrogen atoms or a poly-N-substituted polyalkylene imine having at least two residual active hydrogen atoms bonded to nitrogen atoms to a poly-addition reaction with an epoxy compound having at least two epoxy groups. The prepolymer is cured by heating and agitating a suspension of the prepolymer in an aqueous solution of a water-soluble high polymer or a nonionic surfactant in the absence or presence of known curing agents for epoxy resins. The resulting spherical cured resin is subjected to a saponification reaction or to a reaction with a hydrazine or a polyamine, and then a spherical chelating resin is obtained.

27 Claims, No Drawings

PROCESS FOR PRODUCING CHELATING RESIN AND PRODUCT PRODUCED THEREBY

BACKGROUND OF THE INVENTION a. Field of the Invention

The present invention is concerned with a process for producing a spherical chelating resin. More particularly, it relates to a process for producing a spherical cured resin and to a process for producing a spherical chelating resin from such a spherical cured resin. It pertains also to a spherical cured resin produced by such a process and used for preparation of a spherical chelating resin and to a spherical chelating resin produced by such a process which chelating resin is capable of easily removing and recovering heavy metals contained in industrial waste water discharged from various kinds of industries.

b. Description of the Prior Art

As chelating resins having a chelating ability to adsorb heavy metals, there have heretofore been well known resins produced by introducing into a styrene-divinylbenzene copolymer resin an imino diacetic acid group [$-N(CH_2COOH)_2$] or a polyamine group [$-(NHCH_2CH_2)_nNH_2$], and also known are thiourea type resins or dithio carbamic acid type resins produced by introducing into a phenolic resin such a ligand having a higher affinity for heavy metals as sulfur and nitrogen. These known resins, however, have a lower ability to adsorb or exchange heavy metal ions and a lower adsorbing or exchanging rate. Therefore, they are not fully satisfactory from the viewpoint of cost and efficiency. In addition, once they have adsorbed heavy metals, difficulties are found in recovering the adsorbed heavy metals therefrom. A mercapto group has recently been noticed to have a good reactivity with heavy metals and therefore introduced into cellulose to prepare chelating resins. Derivatives of chitin, which is a kind of polysaccharides and present in abundance in nature, are also found useful for the preparation of chelating resins. Although these polymers are attractive, they are still in laboratorial investigation and far from being practically used.

In U.S. Pat. application Ser. No. 511,629 filed on Oct. 3, 1974, the present inventors have proposed a chelating resin with an excellent ability to adsorb heavy metal ions contained in waste water. Such a chelating resin is prepared by subjecting a poly-N-substituted poly amine having at least two residual active hydrogen atoms bonded to nitrogen atoms or a poly-N-substituted polyalkylene imine having at least two residual active hydrogen atoms bonded to nitrogen atoms to a reaction with a bisepoxy compound to prepare a prepolymer, curing the prepolymer with or without curing agents, and saponifying, with an acid or an alkali, the cured resin as it is or after grinding. In case a solvent is used for the preparation of the prepolymer in this method, however, quite an expensive apparatus is required for recovering the solvent in the curing step. It is technically difficult for the method to produce MR (Macroreticular) type resins, and more specifically the resulting resin verges on a gel. It is also difficult to grind the cured resin and the grain size distribution of the ground resin is considerably wide. Under the circumstances, there have still been various obstacles to an industrial materialization of the method from the standpoint of economy and efficiency of the chelating resin produced.

SUMMARY OF THE INVENTION

A primary object of the present invention is, therefore, to provide a chelating resin capable of promptly, simply, cheaply and effectively removing heavy metals contained in industrial waste water exhausted from various industries such as mines, electrolysis, electric cell, wire, semiconductor, plating, catalyst, fiber, pigment, dye, dyeing, polymer and the like industries and also capable of easily recovering adsorbed heavy metals. More particularly, it is to provide a chelating resin capable of performing chelating reactions with heavy metals detrimental to health such as mercury, cadmium, zinc, copper and lead and with noble metals such as gold, platinum and silver, to adsorb the heavy metals and noble metals and also capable of easily releasing the adsorbed heavy metals and noble metals to recover them.

Another object of the present invention is to provide a spherical chelating resin with excellent properties which can be easily produced on an industrial scale.

Still another object of the present invention is to provide a chelating polymer having an ability to remove heavy metals as mentioned above and moreover being extensively as an electrostatic inhibitor as an electroconductive polymer, a scale removing agent, a combustion retardant and a cosmetic filler.

Yet another object of the present invention is to provide a process for preparing a chelating resin of the type described, which never requires any solvent.

A further object of the present invention is to provide a process for preparing a chelating resin of the type described, which advantageously permits easily recovering a solvent when such is used.

Still a further object of the present invention is to provide a spherical chelating resin having desirable grain sizes which can be prepared without requiring any special granulating operation.

A yet further object of the present invention is to provide a chelating resin having a great resistance to alkalis, chemicals and shocks.

A further object of the present invention is to provide a process for producing a spherical cured resin used for preparation of a spherical chelating resin of the type described.

The above and other objects as well as advantages of the present invention will become apparent upon reading the following detailed description.

DETAILED DESCRIPTION OF THE PREFERRED EMBODIMENTS

In order to achieve the above-mentioned objects and more particularly eliminate the drawbacks in the method and in efficiency of the chelating resin disclosed in U.S. Pat. application Ser. No. 511,692, attain a simple, industrial preparation process, and improve the efficiency of the chelating resin and lower manufacturing cost, the present inventors have made an extensive study and invented a remarkable process which produces on an industrial scale a spherical chelating resin having excellent properties.

According to the present invention, a chelating resin is produced by a process which comprises: preparing a prepolymer by a polyaddition reaction of a poly-N-substituted polyamine or a poly-N-substituted polyalkylene imine with an epoxy compound having at least two epoxy groups; curing the prepolymer by heating and agitating a suspension of the prepolymer in an aqueous solution of a water-soluble high polymer or a nonionic surfactant to prepare a spherical cured resin; subjecting the spherical cured resin to a saponification reaction with an alkali or an acid, or to a reaction with a hydrazine or a polyamine if an N-substituted group of the starting amine or imine is an alkyl ester of carboxyalkyl group, to obtain a spherical chelating resin.

The spherical chelating resin obtained by the present invention is markedly characterized by the simplicity of its production process. In case a solvent is employed at that step of preparing a prepolymer, the resulting chelating resin is of an MR type. The MR type chelating resin has a large adsorption capacity and a high adsorption rate with various heavy metal ions and advantageously has a quite high selectivity.

It exhibits superior performances in the unique manner of epoxy resins especially remarkable superiority in chemical durability, alkali-resistance and shock-proofing.

The curing reaction method using a water-soluble high polymer or a nonionic surfactant produces a spherical cured resin of 4 to 300 mesh or finer and can freely and easily control the particle size without any specific granulating process.

The present invention will hereinafter be explained in detail.

In the first step, a poly-N-substituted polyamine having at least two residual active hydrogen atoms bonded to nitrogen atoms or a poly-N-substituted polyalkylene imine having at least two residual active hydrogen atoms bonded to nitrogen atoms is reacted with an epoxy compound at a temperature of 50°–150° C for 1–15 hours in the absence or presence of a solvent to produce a prepolymer in the state of a solution. It is advisable to synthesize the prepolymer in the presence of a solvent because it makes the stirring easy, prevents gelation, allows an MR type resin to form readily in the subsequent curing operation and enhances a physical adsorption ability to heavy metal ions.

The poly-N-substituted polyamine or poly-N-substituted polyalkylene imine having at least two residual active hydrogens bonded to nitrogen atoms which is used in the first step of the present process to synthesize a prepolymer includes ethylenediaminediacetonitrile, ethylenediaminedipropionitrile, ethylenediamined(2-methylpropionitrile), propylenediaminediacetonitrile, propylenediaminedipropionitrile, propylenediamined(2-methylpropionitrile, hexamethylenediaminediacetonitrile, hexamethylenediaminedipropionitrile, hexamethylenediamined(2-methylpropionitrile), m-xylenediaminediacetonitrile, m-xylenediaminedipropionitrile, m-xylenediamine(2-methylpropionitrile) and alkali metal salts or alkylester ($C_1$–$C_4$) of ethylenediaminediacetic acid, ethylenediaminedipropionic acid, ethylenediamined(1-methylpropionic acid), ethylenediamined(2-methylpropionic acid), propylenediaminediacetic acid, propylenediaminedipropionic acid, polypylenediamined(1-methylpropionic acid), propylenediamine(2-methylpropionic acid), hexamethylenediaminediacetic acid, hexamethylenediaminedipropionic acid, hexamethylenediamined(1-methylpropionic acid), hexamethylenediamine(2-methylpropionic acid), m-xylenediaminediacetic acid, m-xylenediaminedipropionic acid, m-xylenediamined(1-methylpropionic acid), m-xylenediamined(2-methylpropionic acid); and those obtained by substitution by a group represented by a general formula $(CHR')_nCN$ (wherein $R'$ is H or $CH_3$ and $n$ is 1 or 2), or alkali metal salt or alkylester of a carboxyalkyl group i.e. $(CHR')_nCOOR$ (wherein $R'$ is H or $CH_3$, $n$ is 1 or 2 and R is an alkali metal or a hydrocarbon group having one to four carbon atoms) of N-alkylethylenediamine, N-alkylpropylenediamine, N-alkylhexamethylenediamine, N-alkyl-m-xylenediamine, N-alkyldiethylenetriamine, N-alkyltriethylenetetramine, N-alkyltetraethylenepentamine, N-alkylpentaethylenehexamine, diethylenetriamine, triethylenetetramine, tetraethylenepentamine, pentaethylenehexamine, polyethyleneimine, poly(2-methylethyleneimine), poly(2-ethylethyleneimine), poly(2,2-dimethylethyleneimine), poly(cis-2,3-dimethylethyleneimine), poly(trans-2,3-dimethylethyleneimine) and the like. As the poly-N-substituted polyalkylene imine, those obtained from copolymerization of ethylene imine and N-substituted ethylene imine can be also used. The above compounds may be used alone or in combination of two or more thereof. However, the poly-N-substituted polyamines and poly-N-substituted polyalkylene imines to be used in the present invention are not limited to the above ones. The alkyl group in the above compounds are an alkyl group having 1 to 8 carbon atoms or a hydroxy-alkyl group having 2 to 8 carbon atoms.

The epoxy compound having at least two of epoxy groups and used in order to synthesize a prepolymer includes 1,3-bis(1,2-epoxypropoxy)benzene, 1,4-bis(1,2-epoxypropoxy)benzene, 2,2-bis(p-1,2-epoxypropoxyphenyl)propane, N,N'-bis(2,3-epoxypropyl)-piperazine, ethylene glycol diglycidyl ether, propylene glycol diglycidyl ether, pentaerythritol diglycidyl ether, glycerol diglycidyl ether, sorbitol diglycidyl ether, polyethylene glycol diglycidyl ether, polypropylene glycol diglycidyl ether, vinylcyclohexenedioxide, glycerol triglycidyl ether, pentaerythritol tetraglycidyl ether, 1,1,2,2-tetrakis(p-1,2-epoxypropoxyphenyl)-ethane, polyepoxide of polybutadiene, N,N-bis(2,3-epoxypropyl)-m-(1,2-epoxypropoxy)aniline, N,N,N',N'-tetrakis(2,3-epoxypropyl)-p-phenylenediamine, N,N,N',N'-tetrakis(2,3-epoxypropyl)-p-xylenediamine, N,N,N',N'-tetrakis(2,3-epoxypropyl)-m-xylenediamine, N,N-bis(2,3-epoxypropyl)aniline, 1,1-bis[-bis(2,3-epoxypropyl)-iminophenyl]methane and the like. The above epoxy compounds may be used alone or in combination of two or more thereof. The epoxy compound used in the present invention is not limited to those indicated above.

The organic solvent used in the present invention includes organic solvents such as benzene, toluene, xylene, chlorobenzene, o-dichlorobenzene, butyl-cellosolve, isopropyl alcohol, dimethyl formamide (DMF), dimethyl sulfoxide (DMSO), tetrahydrofuran (THF), dioxane, ethanol, carbon tetrachloride, chloroform, n-hexane, cyclohexane, N-methylpyrrolidone, water and the like. Furthermore, it includes diluents for epoxy resins such as octylene oxide, butylglycidyl ether, styrene oxide, phenylglycidyl ether, p-butylphenol glycidyl ether, allylglycidyl ether, and glycidyl methacrylate. These may be used alone or in combination as a mixture.

Descriptions will hereinafter be directed to the curing reaction. The prepolymer obtained in the foregoing manner is stirred and suspended in an aqueous solution of a water-soluble high polymer or a nonionic surfactant and subjected to a curing reaction at 30°–100° C for 3–30 hours, preferably at 80°–100° C for 3–7 hours, with or without known curing agents for epoxy resins. Then, spherical cured resins having a uniform grain size are obtained.

The curing agents for epoxy resins used in this curing step includes thiourea, diethylenetriamine, triethylenetetramine, tetracetylenepentamine, m-phenylenediamine, m-xylenediamine, ethylenediamine, propylenediamine, hexamethylenediamine, heterocyclic diamine, N-aminoethylpiperazine, diaminodiphenylmethane, diaminodiphenylsulfone, phthalic anhydride and the like.

As the water-soluble high polymer, carboxymethylcellulose, polyvinylalcohol, polyvinylpyrrolidone, polyethyleneglycol (M.W.=400-600) methylcellulose, polyvinylmethyl ether, polymethacrylate, starch, and gelatin can be employed.

The nonionic surfactant used in the present process preferably contains polyoxyethylene group or polyoxypropylene group.

Finally, explanation will made on a saponification reaction of the spherical cured resin and a reaction of the same resin with a hydrazine genus or a polyamine genus.

The spherical cured resin may be saponified in a 1-20 wt. percent aqueous solution of an alkali or an acid at a temperature of 60°-100° C for a period of 1-10 hours to obtain a spherical chelating resin. If an N-substituted group of the starting amine or imine is an alkyl ester of carboxyalkyl group, the resulting spherical cured resin may be reacted either with a hydrazine or with a polyamine. The reaction with a hydrazine is carried out under a normal pressure or an elevated pressure at a temperature of 40°-100° C for a period of 1-5 hours to obtain a hydrazine type spherical chelating resin. In the reaction with a polyamine, the spherical cured resin is dealcoholated in a polyamine at a temperature of 80°-160° C for a period of 1-8 hours to obtain a polyamine type spherical chelating resin.

For example, hydrazinehydrate, hydrazide maleate, thiosemicarbazide, hydrooxyethylhydrazine, and dihydrazide oxalate can be employed as the hydrazine. The polyamine used herein include ethylenediamine, propylenediamine, hexamethylenediamine, m-xylenediamine, diethylenetriamine, triethylenetetramine, tetraethylenepentamine and pentaethylenehexamine.

As explained above, the present process can prepare a spherical chelating resin easily and at a low cost on an industrial scale, and the resulting spherical MR type chelating resin has a very high capacity in the adsorption amount (exchanging amount) for heavy metal ions and also has a high adsorption rate. Moreover, it has such a high selectivity of heavy metal ions in an aqueous solution that it can completely adsorb or remove heavy metal ions out of a solution containing not only traces of the heavy metal ions but also a high concentration of various other metal ions. In addition, it is of superior properties proper to an epoxy resin and excellent in chemical, alkali and shock resistance. It is noted that heavy metal ions adsorbed by the spherical chelating resin are readily and effectively eluted by hydrochloric acid, sulfuric acid, or other suitable desorption agents.

The following examples are included merely to aid in the understanding of the invention, and variations may be made by one skilled in the art without departing from the spirit and scope of the invention. Unless otherwise stated, quantities are express as parts by weight.

EXAMPLE 1

A charge of 100 parts of methyl ester of ethylene diamine dipropionic acid, 240.3 parts of 2,2-bis(p-1,2-epoxypropoxy phenyl)propane and 100 parts of toluene was subjected to a polyaddition reaction in a stream of nitrogen at a temperature of 80° to 90° C for 4 hours and cooled to a temperature of 30° to 40° C, mixed with 2.1 parts of diethylene triamine as curing agent. The prepolymer solution was gradually added, while stirring, to 2,000 parts of a 0.5 wt.% aqueous solution of polyvinyl alcohol (degree of polymerization: 1,000 to 1,500) to produce a suspension in the aqueous phase. The suspension was held at a temperature of 80° to 85° C for 5 hours while toluene was distilled off to produce white spherical particles of a hard, strong and resilient cured resin. This cured resin was washed well with hot water to remove polyvinyl alcohol and was then saponified in 1,200 parts of a 5 wt.% aqueous solution of caustic soda at a temperature of 90° to 100° C for 3 hours. After saponification, it was well washed with salt solution and dried under a reduced pressure to produce white spherical particles (40 to 100 mesh) of a hard, resilient and cured chelating resin having a chelating ability. The yield was 94.8%.

The total exchanging capacity of the chelating resin obtained was sought by relying on the Batch operation. More specifically, its total exchanging amount was determined by adding 1.0 gram of the chelating resin into 1.0 liter of respective aqueous solutions (initial concentration: 300 ppm) of copper sulfate, cadmium sulfate, lead nitrate and mercury (II) chloride, gently agitating the respective mixture at room temperature for 3 hours, having them to stand for 20 hours, filtrating them, and measuring metal ion contents in the respective filtrates through the atomic absorption spectrochemical analysis.

In case of the chelating resin of 60-80 mesh, the total exchanging capacity was noted to be 58.4 g/Kg-R for $Cu^{2+}$, 74.5 g/Kg-R for $Cd^{2+}$, 120 g/Kg-R for $Pb^{2+}$, and 181 g/Kg-R for $Hg^{2+}$.

EXAMPLE 2

A charge of 100 parts of methyl ester of ethylene diamine dipropionate, 197 parts of polyethylene glycol diglycidyl ether (ether equivalent = 170.0) and 200 parts of toluene was subjected to a polyaddition reaction in a stream of nitrogen at a temperature of 80° to 85° C for 3 hours, cooled to a temperature of 30° to 40° C, and mixed with 2.1 parts of diethylene triamine as curing agent. Subsequently, the curing and saponification reactions were carried out in the substantially same manner as described in Example 1, except that 2,500 parts of a 0.2 wt.% aqueous solution of polyoxyethylene lauryl ether (molecular content of ethylene oxide = 10) were used instead of polyvinyl alcohol in the curing reaction. The resulting cured chelating resin was in the form of soft white fragile spherical particles which were insoluble in water and organic solvents. The yield was 85%. The total exchanging capacity for $Hg^{2+}$ was determined by the procedure described in Example 1, except that spherical particles of the chelating resin of 40 to 60 mesh size were used, and the result was 274 g/Kg-R.

EXAMPLE 3

A charge of 80 parts of methyl ester of m-xylene diamine diacetic acid, 73.8 parts of 1,3-bis(1,2-epoxy propoxy)benzene and 50 parts of benzene was subjected to a polyaddition reaction in a stream of nitrogen at a temperature of 70° to 80° C for 3 hours, cooled to a temperature of 30° to 40° C, and mixed with 2.1 parts of diethylene triamine as hardening agent. The curing and saponification reactions were carried out in the substantially same manner as described in Example 1, except that 1,000 parts of a 0.5 wt.% aqueous solution of polyethylene glycol ($\overline{M.W.}$ = 2,000) was used in the curing reaction. The resulting chelating resin was in the form of white spherical particles of a hard and resilient cured resin insoluble in water and most organic solvents. The yield was 86%. The total exchanging capacity for $Cu^{2+}$ was determined by the method described in Example 1, except that spherical particles of the chelating resin of 40 of 60 mesh were employed, and the result was 36 g/Kg-R.

EXAMPLE 4

A charge of 50 parts of methyl ester of m-xylene diamine di-dipropionic acid, 43.3 parts of propylene glycol diglycidyl ether (epoxy equivalent = 104.6) and 20 parts of benzene was subjected to a polyaddition reaction in a stream of nitrogen at a temperature of 70° to 80° C for 2 hours, cooled to a temperature of 30° to 40° C and mixed with 1.1 parts of diethylene triamine. Subsequent reactions were all conducted in the substantially same way as described in Example 1, except that 900 parts of a 1 wt.% aqueous solution of polyvinylpyrrolidone ($\overline{M.W.}$ = 10,000) were used in the curing reaction. Then, these were obtained white spherical particles (60 to 200 mesh size) of a hard and brittle cured chelating resin insoluble in water and most organic solvents. The yield was 76%. The total exchanging capacity for $Cu^{2+}$ was determined by the method described in Example 1, except that spherical particles of the chelating resin of 60 to 100 mesh size were used, and the result was 67.4g/Kg-R.

Example 5

A charge of 100 parts of pentaethylene hexamine and 222 parts of methyl acrylate was subjectd to the Michael addition reaction at a temperature of 70 to 80° C for 8 hours, cooled to a temperature of 40° C, mixed with 106 parts of 1,3-bis(1,2-epoxy propoxy)benzene and 300 parts of toluene, subjected to a polyaddition reaction in a stream of nitrogen at a temperature of 70° to 80° C for 4 hours, cooled to a temperature of 30 ° to 40° C and mixed with 2.1 parts of ethylene diamine as curing agent. The subsequent curing and saponification reactions were carrid out in the substantially same fashion as described in Example 1, except that 3,500 parts of a 0.5 wt.% aqueous solution of carboxymethyl cellulose were employed in the curing reaction. The product was in the form of light yellow spherical particles of a hard and highly shock-resistant cured chelating resin which was insoluble in water and most organic solvents. The yield was 84%. The total exchanging capacity for $Cu^{2+}$ was determined by the method described in Example 1, except that spherical particles of the chelating resin of 40 to 60 mesh size were used, and the result was 72.4 g/Kg-R. The exchanging capacity for $Hg^{2+}$ was 278 g/Kg-R.

EXAMPLE 6

A charge of 30 parts of poly(2-ethyl ethylene imine), 13.4 parts of acrylonitrile and 50 parts of ethanol was subjected to an addition reaction at a temperature of 70 to 80° C for 10 hours, cooled to a temperature of 40° C, mixed with 17.9 parts of 1.4-bis(1,2-epoxy propoxy)benzene and 50 parts of toluene, subjected to a polyaddition reaction in a stream of nitrogen at a temperature of 70 to 80° C for 4 hours. The subsequent curing and saponification reactions were conducted in the substantially same manner as described in Example 1. The product was in the form of light yellow spherical particles (20 to 80 mesh size) of a hard and highly shock-resistant cured chelating resin which was insoluble in water and organic solvents. The yield was 73%. The total exchanging capacity for $Cu^{2+}$ was determined by the method described in Example 1, except that spherical particles of chelating resin of 40 to 60 mesh size were employed, and the result was 72.4 g/Kg-R.

EXAMPLE 7

A charge of 100 parts of poly(cis-2,3-dimethyl ethylene imine), 94.7 parts of methyl acrylate and 200 parts of a 1:1 toluene-ethanol mixture was subjected to the Michael addition reaction at a temperature of 70° to 80° C for 8 hours, cooled to a temperature of 40° C, mixed with 158.1 parts of 2,2-bis(p-1,2-epoxy propoxy phenyl)propane, subjected to a polyaddition reaction of a stream of nitrogen at a temperature of 70° to 80° C for 3 hours and mixed with 10 parts of diethylene triamine. The subsequent curing and saponification reactions were conducted in the substantially same manner as described in Example 1. The product was in the form of light yellow spherical particles (20 to 60 mesh size) of a hard and highly shock-resistant cured chelating resin which was insoluble in water and organic solvents. The yield was 76%. The total exchanging capacities for $Hg^{2+}$ and $Cu^{2+}$ were determined by the method described in Example 1, except that spherical particles of the chelating resin of 20 to 40 mesh size were employed, and the results were 251 g/Kg-R for $Hg^{2+}$ and 76.5 g/Kg-R for $Cu^{2+}$.

EXAMPLE 8

A charge of 100 parts of polyethylene imine, 140 parts of methyl acrylate and 150 parts of a 150 parts of a 1:1 toluene-ethanol mixture was subjected to the Michael addition reaction at a temperature of 70° to 80° C for 3 hours, cooled to a temperature of 40° C, mixed with 74.0 parts of 1,3-bis(1,2-epoxypropoxy)-benzene and subjected to a polyaddition reaction in a stream of nitrogen at a temperature of 70° to 80° C for 3 hours. The subsequent curing and saponification reactions were carried out in the substantially same manner as described in Example 1, except 1, 1,000 parts of a 0.5 wt.% aqueous solution of polyoxyethylene nonyl phenol (adduct containing 10 mols of ethylene oxide) were employed. The resulting chelating resin was in the form of light yellow hard spherical particles which were insoluble in water and most organic solvents. The yield was 82%. The total exchanging capacity for $Hg^{2+}$ was determined by the method described in Example 1, except that spherical particles of the chelating resin of 40 to 60 mesh size were used, and the result was 291 g/Kg-R.

EXAMPLE 9

A charge of 100 parts of a copolymer of ethylene imine and N-cyanomethyl ethylene imine (molar ratio: 1:9), 21.8 parts of 2,2-bis(p-1,2-epoxypropoxy phenyl)propane and 120 parts of toluene was subjected to a polyaddition reaction in a stream of nitrogen at a temperature of 70°–80° C for 3 hours. The resulting prepolymer solution was gently poured, in drops, while stirring, into 1000 parts of an aqueous solution of 0.5 wt.% of polyvinyl alcohol (degree of polymerization: 1000 to 1500) which had been preheated to about 70° C. As a result the prepolymer was produced as a suspension in an aqueous phase. The suspended prepolymer was then heated further at 88°–100° C continuously for 5 hours while distilling off toluene. Thus, a yellow, spherical, hard, strong and elastic cured resin was obtained. This cured resin was then washed thoroughly with hot water to remove polyvinyl alcohol. Thereafter, the resulting cured resin was subjected to a saponification reaction in 1,000 parts of a 5 wt.% aqueous solution of caustic soda at 90°–100° C for 3 hours. The saponified was thoroughly washed with distilled water and was dried under a reduced pressure. Thus, a spherical, hard, elastic, yellow cured chelating resin (40–100 mesh size) having a chelating ability was obtained. The yield was 89.6%. The determination of the total exchanging capacity for $Hg^{2+}$ was conducted by the use of spherical particles of the chelating resin of 40–60 mesh size according to the method described in Example 1 and the result was 274 g/Kg-R.

EXAMPLE 10

A charge of 200 parts of a copolymer of ethylene imine and methyl ester of N-ethyleneglycine (molar ratio: 0.5:9.5), 26.2 parts of pentaerithrito diglycidyl ether and 220 parts of toluene was subjected to a polyaddition reaction in a stream of nitrogen at a temperature of 70°–80° C for 2 hours. The subsequent curing of the prepolymer and saponification were carried out in the substantially same manner as that described in Example 9, except for the curing reaction in which 1500 parts of a 0.5 wt.% aqueous solution of polyvinyl pyrrolidone were used in place of polyvinyl alcohol. The resulting cured chelating resin was in the form of hard, elastic, light yellow spherical particles which were sparingly soluble in water and in most organic solvents.

The yield was 87.4%. 100 ml of the spherical particles of the chelating resin of 10–50 mesh size (moisture content: 63.4%) were charged into a column into which was introduced, at sv = 20, 15.6 liters of an aqueous solution of copper sulfate whose copper ion concentration was 100 ppm. The treating liquid showed the presence or copper ion. (The total exchanging capacity for $Cu^{2+}$ was 15.6 g/l-R). 150 ml of 2N-hydrochloric acid was introduced, at sv = 2, to the cured chelating resin which had adsorbed copper ion. The recoverability was 78.5%. The total exchanging capacity for $Hg^{2+}$ was determined according to the method described in Example 1 and the result was 267 g/Kg-R.

EXAMPLE 11

A charge of 230 parts of a copolymer of ethylene imine and butyl ester of N-ethylene glycine (molar ratio: 1:9), 26.8 parts of polyethylene glycol diglycidyl ether and 240 parts of toluene was subjected to polyaddition reaction in a stream of nitrogen at a temperature of 80°–85° C for 4 hours. The subsequent reactions were carried out in the substantially same manner as that described in Example 9, except that 2,000 parts of an aqueous solution of 0.8 wt.% of carboxymethyl cellulose were used in the curing reaction. The resulting cured chelating resin was noted to be in the form of soft, brittle, yellow, spherical particles which were insoluble in water and in organic solvents. The yield was 78.7%.

By use of the sperical particles of the cured chelating resin as 40–60 mesh size, the total exchanging capacity was determined according to the method described in Example 1. The result showed 67.4 g/Kg-R for $CU^{2+}$ and 224 g/Kg-R for $Hg^{2+}$.

EXAMPLE 12

A charge of 100 parts of a copolymer of ethylene imine and methyl ester of N-carboxyethyl ethylene imine (molar ratio: 2:8 ), 32.1 parts of N,N'-bis(2,3-epoxypropyl)piperazine and 150 parts of toluene was subjected to a polyaddition reaction in a stream of nitrogen at a temperature of 70°–80° C for 4 hours, followed by cooling to 30°–40° C, and then 3 parts of diethylene triamine were added as curing agent. The resulting prepolymer was gently poured, in drops, whilst stirring, onto 1,000 parts of an aqueous solution of 2 wt.% of polyethylene glycol (mean molecular weight: 6,000), with the result that the prepolymer was suspended in an aqueous system. In this condition, the suspended prepolymer was heated further at 88°–100° C, continuously for 5 hours while distilling off toluene. As a result, a cured resin which was light yellow, spherical, hard, strong and elastic was obtained. This cured resin was then washed thoroughly with hot water to remove polyethylene glycol. Thereafter, a saponification reaction was conducted in 1,000 parts of an aqueous solution of 5 wt.% of caustic soda at 90°–100° C for 3 hours. After the saponification, the cured resin was thoroughly washed with distilled water, and was dried under reduced pressure. Thus, a chelating resin was obtained in the form of spherical, hard, elastic and light yellow particles of 40–100 mesh size. The yield was 81.4%.

By the use of spherical particles of the chelating resin of 40–60 mesh size, the total exchanging capacity was determined. The result was noted to be 72.4 g/Kg-R for $Cu^{2+}$ and 278 g/Kg-R for $Hg^{2+}$.

EXAMPLE 13

A charge of 100 parts of hexaethylenediaminedipropionitrile, 87.0 parts of N,N-bis(2,3-epoxypropyl)aniline (epoxy equivalent = 145), 42.1 parts of vinylcyclohexene (epoxy equivalent = 70.1), and 200 parts of ethanol was subjected to a polyaddition reaction in a stream of nitrogen at a temperature of 70°–80° C for 1.5 hour and cooled to a temperature of 30°–40° C, mixed with 16.2 parts of triethylenetetramine as a curing agent. The curing reaction and saponification reaction were carried out in the substantially same manner as in Example 1, except that 1500 parts of a 0.2 wt.% aqueous solution of polyvinyl methyl ether were used in the curing reaction instead of polyvinyl alcohol. The resulting spherical chelating resin was light yellow, hard and brittle. The yield was 81.4%. The total exchanging capacity for $Cu^{2+}$ was determined according to the method described in Example 1 by the use of the spherical chelating resin of 40–60 mesh, and the result was 41 g/Kg-R.

EXAMPLE 14

A charge of 100 parts of m-xylenediamined(2-methylpropionitrile, 103.3 parts of sorbitol diglycidyl ether (epoxy equivalent = 150) 40.9 parts of N,N,N',-N'-tetrakis(2,3-epoxypropyl)-p-phenylenediamine (epoxy equivalent = 118.6), and 100 parts of xylene was subjected to a polyaddition in a stream of nitrogen at a temperature of 75°–85° C for 1 hour and cooled to a temperature of 30°–40° C, mixed with 5.0 parts of triethylenetetramine as a curing agent. The curing reaction and saponification reaction were carried out in the substantially same manner as in Example 1 except that 17,000 parts of a 0.5 wt.% aqueous solution of polymethacrylate were used in the curing reaction instead of polyvinyl alcohol. The resulting spherical chelating resin was light yellow, hard and resilient. The yield was 74.4%. The total exchanging capacities for $Cu^{2+}$ and $Hg^{2+}$ were determined according to the method described in Example 1 by the use of the spherical chelating resin of 40–60 mesh, and the results were 52 g/Kg-R and 210 g/Kg-R, respectively.

EXAMPLE 15

A charge of 100 parts of poly(2-methylethyleneimine), 82.3 parts of methacrylonitrile, and 120 parts of ethanoltoluene (1:1) was subjected to an addition reaction at a temperature of 70°–80° C for 6 hours and cooled to a temperature of 40° C. Then, 575 parts of glycelol diglycidyl ether (epoxy equivalent = 139.5) and 31.4 parts of glycelol triglycidyl ether (epoxy equivalent = 108.4) were added to the resulting adduct and the mixture was subject to a polyaddition reaction in a stream of nitrogen at a temperature of 80°–90° C for 4 hours. The resulting product was again cooled to a temperature of 30°–40° C, and thereafter, 5.0 parts of pentaethylenehexamine were added thereto. The curing reaction and saponification reaction were carried out in the substantially same manner as in Example 1, except that 1,700 parts of a 1 wt.% aqueous solution of Gelatin were used in the curing reaction instead of polyvinyl alcohol. The resulting spherical chelating resin was light yellow, hard and brittle. The yield was 78.0%. The total exchanging capacity for $Cu^{2+}$ was determined according to the method described in Example 1 by the use of the spherical chelating resin of 40–60 mesh, and the result was 40 g/Kg-R.

EXAMPLE 16

A charge of 50 parts of methyl ester of N-octyl-N'-carboxyethylethylenediamine, 50.0 parts of ethyleneglycol diglycidyl ether, 25.2 parts of polyepoxide of polybutadiene (epoxy equivalent = 188.5), and 55 parts of toluene-ethanol (1:1) was subjected to a polyaddition in a stream of nitrogen at a temperature of 75°–80° C for 3 hours and cooled to a temperature of 30°–40° C, mixed with 8.0 parts of diethylenetriamine as a curing agent. The curing reaction and saponification reaction were carried out in the substantially same manner as in Example 1 except that 700 parts of a 0.8 wt.% aqueous solution of starch were used in the curing reaction instead of polyvinyl alcohol. The resulting spherical chelating resin was white and hard. The yield was 86.4%. The total exchanging capacity for $Cu^{2+}$ was determined according to the method described in Example 1 by the use of the spherical chelating resin of 40–60 mesh, and the result was 20.4 g/Kg-R.

EXAMPLE 17

A charge of 100 parts of N-(2-hydroxyoctyl-N-'-(propionitrile)ethylenediamine, 93.1 parts of polypropylene glycol diglycidyl ether (epoxy equivalent = 190) 68.5 parts of N,N,N',N'-tetrakis(2,3-epoxypropyl)-p-xylenediamine(epoxy equivalent = 134.3), and 105 parts of isopropyl alcohol was subjected to a polyaddition in a stream of nitrogen at a temperature of 80°–85° C for 3 hours and cooled to a temperature of 30°–40° C, mixed with 6.7 parts of m-xylenediamine as a curing agent. The curing reaction and saponification reaction were carried out in the substantially same manner as in Example 1 except that 2,200 parts of a 1 wt.% aqueous solution of methylcellulose were used in the curing reaction instead of polyvinyl alcohol. The resulting spherical chelating resin was light yellow, tender and brittle. The yield was 87.4%. The total exchanging capacities for $Cu^{2+}$ and $Hg^{2+}$ were determined according to the method described in Example 1 by the use of the spherical chelating resin of 40–100 mesh, and the result were 23.5 g/Kg-R and 110 g/Kg-R, respectively.

EXAMPLE 18

A charge of 50 parts of poly(2,2-dimethylethyleneimine), 72.0 parts of butyl acrylate, and 100 parts of ethanol was subjected to the Micheal addition reaction at a temperature of 50°–60° C for 12 hours and cooled to a temperature of 40° C. Then, 24.3 parts of N,N-bis(2,3-epoxypropyl)-m-(1,2epoxypropoxy)aniline (epoxy equivalent = 115.4) and 50.6 parts of N,N,N',N'-tetrakis(2,3-epoxypropyl)-m-xylenediamine (epoxy equivalent = 120) were added to the resulting adduct and the mixture was subjected to a polyaddition reaction in a stream of nitrogen at a temperature of 70°–80° C for 3 hours. The resulting product was again cooled to a temperature of 30°–40° C, and thereafter, 9.4 parts of thiourea were added thereto. The curing reaction and saponificaton reaction were carried out in the same manner as in Example 1. After sufficiently dried, the obtained spherical cured resin was swelled with toluene for a whole day. The swelled spherical cured resin was separated by filtration and then placed in 220 parts of hydrazinehydrate and reacted at a temperature of 60°–70° C for 5 hours. After completion of the reaction, the obtained spherical chelating resin was separated by filtration and then purified by distilling out the remaining toluene and impurities through a steam distillation and by sufficiently washing with heated water. As a result, a white hydrazine type spherical chelating resin was obtained.

EXAMPLES 19–22

In Examples 19 to 22, various kinds of hydrazine type spherical chelating resins were obtained in the substantially same preparing manner as that employed in Example 18. In stead of hydrazine hydrate, however, thiosemicalbazide was used in Example 19 as functional groups of a chelating resin; hydroxyethylhydrazine in Example 20; hydrazide maleate in Example 21; and hydrazide oxalate in Example 22.

The respective total exchanging capacities for $Hg^{2+}$ were measured by the use of the hydrazine type spherical chelating resins of 20–60 mesh obtained in Examples 18–22, respectively, and the results are listed in Table 1.

Table 1

| | Total Exchanging Capacity for $Hg^{2+}$ of the Hydrazine Type Spherical Chelating Resins | |
|---|---|---|
| Example | Hydrazine as Functional Groups of a Chelating Resin | Total Exchanging Capacity for $Hg^{2+}$(g/Kg-R) |
| 18 | hydrazine hydrate | 286.5 |
| 19 | thiosemicarbazide | 315 |
| 20 | hydroxyethylhydrazine | 250 |

Table 1-continued

Total Exchanging Capacity for Hg²⁺ of the
Hydrazine Type Spherical Chelating Resins

| Example | Hydrazine as Functional Groups of a Chelating Resin | Total Exchanging Capacity for Hg²⁺(g/Kg-R) |
|---|---|---|
| 21 | hydrazide maleate | 140 |
| 22 | dihydrazide oxalate | 184 |

EXAMPLE 23

A charge of 50 parts of polyethyleneimine, 70.0 parts of methyl crotonate, and 100 parts of toluene-ethanol (1:1) was subjected to an addition reaction at a temperature of 70°–80° C for 8 hours and cooled to a temperature of 40° C. Then, 131.3 parts of 1,1-bis[bis(2,3-epoxypropyl)iminophenyl]methane (epoxy equivalent = 141.3) were added to the resulting adduct and the mixture was subjected to a polyaddition reaction in a stream of nitrogen at a temperature of 70°–80° C for 2.5 hours. The resulting product was again cooled to a temperature of 30°–40° C, and thereafter, 5 parts of diethylenetriamine were added thereto. The curing reaction was carried out in the same manner as in Example 1. After sufficiently dried, the obtained spherical chelating resin was placed in 200 parts of ethylenediamine and reacted at a temperature of 150° C for 5 hours. After completion of the reaction, the obtained spherical chelating resin was separated by filtration and purified by washing remaining ethylenediamine out with diluted hydrochloric acid and then by sufficiently washing with distilled water till the used distilled water becomes neutral. By drying the resin in the wind, polyamine type spherical chelating resin was obtained.

EXAMPLES 24–26

In Examples 24 to 26, various kinds of polyamine type spherical chelating resin were obtained in the substantially same preparing manner as that employed in Example 23. In stead of ethylenediamine used in Example 23, however, propylenediamine was employed in Example 24 as functional groups of a chelating resin; hexamethylenediamine in Example 25; and m-xylenediamine in Example 26.

The respective total exchanging capacities for Hg²⁺ were measured according to the method described in Example 1 by the use of the polyamine type spherical chelating resin of 20–60 mesh obtained in Example 23–26, respectively, and the results are listed in Table 2.

Table 2

Total Exchanging Capacity for Hg²⁺ of the
Polyamine Type Spherical Chelating Resins

| Example | Polyamine as Functional Group of a Chelating Resin | Total Exchanging Capacity for Hg²⁺ (g/Kg-R) |
|---|---|---|
| 23 | ethylenediamine | 210.5 |
| 24 | propylenediamine | 189.7 |
| 25 | hexamethylenediamine | 150.4 |
| 26 | m-xylenediamine | 140.0 |

EXAMPLE 27

A charge of 50 parts of poly(trans-2,3-dimethylethyleneimine), 48.5 parts of methyl acrylate, and 150 parts of toluene was subjected to the Micheal addition reaction at a temperature of 70°–80° C for 10 hours and cooled to a temperature of 40° C. Then, 25.3 parts of 1,1,2,2-tetrakis(p-1,2-epoxypropoxyphenyl)ethane (epoxy equivalent = 239.2) and 16.4 parts pentaerythritol tetraglycidyl ether (epoxy equivalent = 155) were added to the resulting adduct and the mixture was subjected to a polyaddition reaction in a stream of nitrogen at a temperature of 75°–80° C for 2 hours. The resulting product was again cooled to a temperature of 30°–40° C, and thereafter, 1.7 parts of triethylenetetramine were added thereto. The curing reaction was carried out in the substantially same manner as in Example 1, except that a 2 wt.% aqueous solution of polyoxyethylenedodecyl ether (molar numbers of additional ethylene oxide = 15) was used in the curing reaction instead of polyvinyl alcohol. After sufficiently dried, the obtained spherical cured resin was placed in 250 parts of diethylenetriamine and reacted at a temperature of 160° C for 3 hours. After completion of the reaction, the obtained spherical chelating resin was separated by filtration and purified by washing remaining diethylenetriamine out with diluted hydrochloric acid and then by sufficiently washing with water till the used water becomes neutral. By drying, polyamine type spherical chelating resin was obtained.

EXAMPLES 28–30

In Examples 28 to 30, various kinds of polyamine type spherical chelating resins were obtained in the substantially same preparing manner as that employed in Example 27. In stead of diethylenetriamine used in Example 27, however, triethylenetetramine was employed in Example 28 as functional groups of a chelating resin, tetraethylenepentamine in Example 29; and pentaethylenehexamine in Example 30.

The respective total exchanging capacities for Hg²⁺ were measured according to the method described in Example 1 by the use of the polyamine type spherical chelating resins of 20–60 mesh obtained in Examples 27–30, respectively, and the results are listed in Table 3.

Table 3

Total Exchanging Capacity for Hg²⁺ of the
Polyamine Type Spherical Chelating Resins

| Example | Polyamine as Functional Group of a Chelating Resin | Total Exchanging Capacity for Hg²⁺ (g/Kg-R) |
|---|---|---|
| 27 | diethylenetriamine | 247.6 |
| 28 | triethylenetetramine | 253.0 |
| 29 | tetraethylenepentamine | 278.8 |
| 30 | pentaethylenehexamine | 284.6 |

What is claimed is:

1. A process for producing a spherical cured resin comprising the steps of:
   1. preparing a solution of 38 to 90 weight percent of a prepolymer by a poly addition reaction of:
      a. a poly-N-substituted polyamine,
      b. a poly-N-substituted polyalkylene imine, or
      c. a mixture of (a) and (b),
   with an epoxy compound having at least two vicinal epoxy groups, said prepolymer obtained by a polyaddition reaction of (a), (b) or (c) with an equal epoxy equivalent of said vicinal epoxy compound to mole number of active hydrogen atoms, optionally in the presence of a curing agent;
   2. forming an aqueous suspension of the thus-prepared prepolymer of step (1) in an aqueous solution of a water-soluble high polymer or a non-ionic surfactant, wherein the weight ratio of prepolymer solution to aqueous solution is 1:1.93 to 1:7.87, and curing the prepolymer in said aqueous solution;

said poly-N-substituted polyamine, poly-N-substituted polyalkylene imine or mixtures thereof having a structure in which an active hydrogen atom bonded to a nitrogen atom of a corresponding polyamine or polyalkylene imine is replaced by a group selected from the group consisting of a cyanoalkyl radical, alkali metal salts of a carboxyalkyl group, and alkyl esters of a carboxyalkyl group, and in which at least two of the active hydrogen atoms bonded to nitrogen atoms remain.

2. A process as defined by claim 1 wherein said poly-N-substituted polyamine is obtained from a polyamine represented by the formula R-NH(R'NH)$_n$H wherein R is a hydrogen, an alkyl radical having 1–8 carbon atoms, or β-hydroxyalkyl radical having 2–8 carbon atoms, R' is an ethylene radical, a phenylene radical, or a xylene radical, and $n$ is an integer from 1 to 5.

3. A process as defined by claim 1 wherein said poly-N-substituted polyalkylene imine is selected from the group consisting of a polymer of ethylene imine, a polymer of 2-methylethylene imine, a polymer of 2,2-dimethylethylene imine, a polymer of cis-2,3-dimethylethylene imine, trans-2,3-dimethylethylene imine, and a copolymer of ethylene imine and N-substituted ethylene imine.

4. A process as defined by claim 1 wherein said cyanoalkyl radical is represented by the general formula (CHR')$_n$CN wherein R' is a hydrogen or a methyl radical, and $n$ is the integer 1 or 2.

5. A process as defined by claim 1 wherein said alkali metal salts and alkyl esters of a carboxyalkyl group are represented by the formula (CHR')$_n$COOR'' wherein R' is a hydrogen or a methyl radical, R'' is an alkali metal or an alkyl radical having 1–4 carbon atoms, and $n$ is the integer 1 or 2.

6. A process as defined by claim 1 wherein said epoxy compound is selected from the group consisting of 1,3-bis(1,2-epoxypropoxy)benzene, 1,4-bis(1,2-epoxypropoxy)-benzene, 2,2-bis(p-1,2-epoxypropoxyphenyl)propane, N,N'-bis(2,3-epoxypropyl)piperazine, ethylene glycol diglycidyl ether, propylene glycol diglycidyl ether, pentaerythritol diglycidyl ether, glycerol diglycidyl ether, sorbitol diglycidyl ether, polyethylene glycol diglycidyl ether, polypropylene glycol diglycidyl ether, vinylcyclohexenedioxide, glycerol triglycidyl ether, pentaerythritol tetraglycidyl ether, 1,1,2,2-tetrakis(p-1,2-epoxypropoxyphenyl)-ethane, polyepoxide of polybutadiene, N,N-bis(2,3-epoxypropyl)-m-(1,2-epoxypropoxy)aniline, N,N,N', N'-tetrakis (2,3-epoxypropyl)-p-phenylenediamine, N,N,N',-N'-tetrakis-(2,3-epoxypropyl)-p-xylenediamine, N,N,N',N'-tetrakis(2,3-epoxypropyl)-m-xylenediamine, N,N-bis(2,3-epoxypropyl)-aniline, and 1,1-bis[bis(2,3-epoxypropyl)iminophenyl]methane.

7. A process as defined by claim 1 wherein conventional curing agents for epoxy resins are used in the step of curing said prepolymer.

8. A process as defined by claim 1 wherein said water-soluble high polymer is selected from the group consisting of carboxymethylcellulose, polyvinyl alcohol, polyvinyl pyrrolidone, polyethylene glycol having a molecular weight of 400 to 600, methylcellulose, polyvinyl methylether, polymethacrylate, starch and gelatin.

9. A process as defined by claim 1 wherein said nonionic surfactant has a polyoxyalkylene group in the molecule thereof.

10. A spherical cured resin produced by a process as defined by claim 1.

11. A spherical cured resin produced by a process as defined by claim 2.

12. A spherical cured resin produced by a process as defined by claim 3.

13. A spherical cured resin produced by a process as defined by claim 4.

14. A spherical cured resin produced by a process as defined by claim 5.

15. A spherical cured resin produced by a process as defined by claim 6.

16. A spherical cured resin produced by a process as defined by claim 7.

17. A spherical cured resin produced by a process as defined by claim 8.

18. A spherical cured resin produced by a process as defined by claim 9.

19. A process for producing a spherical chelating resin comprising the step of subjecting the spherical cured resin of claim 10 to a saponification reaction with an alkali or an acid.

20. A process for producing a spherical chelating resin comprising the step of subjecting the spherical cured resin of claim 10 to a reaction with a hydrazine or a polyamine.

21. A process as defined by claim 20 wherein said hydrazine is selected from the group consisting of hydrazinehydrate, hydrazide maleate, thiosemicarbazide, hydrooxyethylhydrazine, and dihydrazide oxalate.

22. A process as defined by claim 20 wherein said polyamine is selected from the group consisting of ethylenediamine, propylenediamine, hexamethylenediamine, m-xylenediamine, diethylenetriamine, triethylenetetramine, tetraethylenepentamine, and pentaethylenehexamine.

23. A spherical chelating resin produced by a process as defined by claim 19.

24. A spherical chelating resin produced by a process as defined by claim 20.

25. A spherical chelating resin produced by a process as defined by claim 21.

26. A spherical chelating resin produced by a process as defined by claim 22.

27. A process as defined in claim 1 wherein from 0.2 to 2.0 weight percent of said water-soluble high polymer or non-ionic surfactant is employed to form the aqueous suspension.

* * * * *